United States Patent Office 3,392,150
Patented July 9, 1968

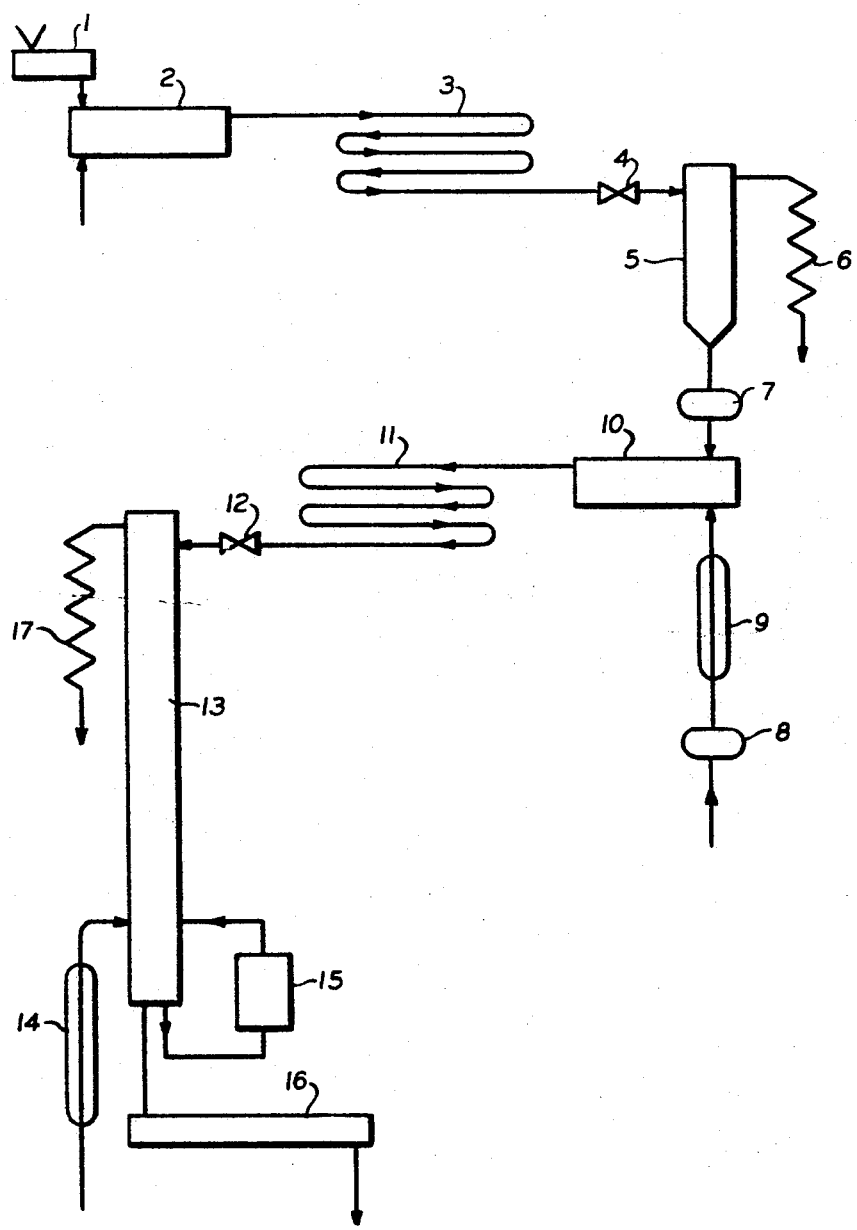

1

3,392,150
ETHERIFIED AMINO FORMALDEHYDE PRODUCTS
Herbert P. A. Groll, Pixbo, Sweden
Continuation of application Ser. No. 299,893, Aug. 5, 1963, which is a continuation-in-part of application Ser. No. 43,916, July 19, 1960. This application Jan. 5, 1967, Ser. No. 607,577
Claims priority, application Great Britain, July 23, 1959, 25,353/59
14 Claims. (Cl. 260—67.6)

ABSTRACT OF THE DISCLOSURE

Etherified amino formaldehyde resins characterized by fast curing good pot life, and which yield protective films of good hardness, are produced by a continuous process. The process includes a first step in which an amino-formaldehyde condensation product is produced from, for example, urea and formaldehyde; a second step in which the said condensation product is dehydrated by rapid heating to produce a substantially anhydrous, unstable melt, and a third step in which the said condensation product is etherified with an alcohol. Overall time for the three steps can be less than one hour.

---

This application is a continuation-in-part of application Ser. No. 43,916, filed July 19, 1960, and is a continuation of application Ser. No. 299,893, filed Aug. 5, 1963.

This invention relates to an improved method for production of etherified amino-formaldehyde resins as well as to improved resins produced by this method. As raw materials for these resins formaldehyde, an amido compound of carbonic acid, and a lower aliphatic alcohol with preferably 4 or 5 carbon atoms are used. The term amido compounds of carbonic acid comprises those compounds containing $NH_2$-groups which upon complete hydrolysis yield carbonic acid and ammonia, e.g. urea, thiourea, and melamine. Examples of alcohols suitable for carrying out this invention comprise e.g. normal and secondary butyl alcohol, iso-butyl alcohol, normal amyl-alcohol and the iso-amyl-alcohols.

The reaction products, etherified amino-formaldehyde resins, are commercially produced with a great variety of properties and used chiefly as constituents in surface coating compositions, especially in combination with alkyd resins and epoxy resins.

The reactions leading from the raw materials enumerated to the products mentioned consist in the first instance of an addition of at least one molecule of formaldehyde to every $NH_2$-group of the amido compound whereby a methylol compound is formed. This methylol compound is then simultaneously etherified with one of the alcohols enumerated above and condensed to an increased molecular weight whereby the product, usually obtained as solution in an excess of the alcohol used, becomes viscous to the degree desired for its use as a constituent in surface coating compositions.

2

While it is recognized that it is desirable to remove the water, introduced into the reaction mixture by the aqueous formaldehyde, from the methylol compound completely before reacting the methylol compound with the alcohol chosen, this manner of operation has met in practice with difficulties because of the high melting point of the methylol compound and of the fact that the methylol compound decomposes rapidly at its melting point. Therefore, the common practice in the prior art was to dehydrate the methylol compound only to such a degree that the resulting reaction mixture is still liquid at 65–75° C. at which temperature the compound is sufficiently stable to be handled in commercial batches. This means in the case of dimethylol urea that at least 15% of water must remain in the reaction mixture. In the case of melamine formaldehyde condensation products practically no water could be removed before the alcohol was added, so that all the water of the aqueous formaldehyde together with the water formed during the etherification and condensation had to be removed as an azeotrope with the alcohol. This is a decided disadvantage of the older processes not only because the azeotropic distillation is a time consuming operation, but also because the lengthy treatment of the reaction product under these conditions has an unfavorable influence on the quality of the product obtained.

It has therefore been suggested to produce methylol compounds of urea, containing so much combined formaldehyde that the addition compound by prolonged heating at 60–90° C. in aqueous solution looses its crystallizability and in practically anhydrous condition is a syrupy liquid with such a low melting point that it is quite stable even at temperatures considerably above its melting point. However, if these syrupy polymethylol compounds of urea are etherified with one of the alcohols mentioned, the resulting resins have inferior curing properties and produce soft coating films with inferior gloss. If the ratio of formaldehyde to urea in these methylol compounds exceeds about 2.7, additional urea must be added during the etherification and condensation step. This is an undesirable complication of the operating technique, and most of the time saved by avoiding the azeotropic distillation is lost again by this additional operation.

It has now been found that all the above-mentioned difficulties can be overcome if the reaction compound of formaldehyde and the amino compound chosen is dehydrated according to copending application Ser. No. 565,256, filed Feb. 13, 1956 (replaced by Ser. No. 254,547, filed Jan. 14, 1963) and the corresponding British Patent 801,404, and the highly unstable fused product instead of being allowed to solidify to form a stable solid, is reacted directly with the hot acidified alcohol chosen. The dehydrated fused dimethylol urea obtained according to this patent can contain only 2–5% of water, while the dehydrated fused methylol melamine can contain only 7% of water.

The melting points of the preferred melts used according to this invention were found to be above 80° C. At the relatively high transfer temperatures necessitated by their melting points the life of the melts which are to be reacted with the hot acidified alcohol, is quite limited.

Thus, a melt of the reaction product of 2.5 mols of formaldehyde per 1 mol of urea containing 3% of water solidified at 65° C. to a crystalline solid which had a melting point of 120° C. This melt was withdrawn from the evaporator into a test tube at 95° C. and maintained at 110° C. by inserting the test tube into a hot oil bath. After 5½ minutes an amorphous precipitate began to appear and after 13 minutes the whole mass had turned to an insoluble and infusible solid. A melt of the reaction product of 2.2 moles of formaldehyde with 1 mol of urea containing 3% of water crystallized at 75° C. and showed a melting point of about 120° C. The melt was withdrawn from the evaporator into a test tube at 100° C. and when it was maintained at 110° C. it became cloudy after 5 minutes and turned into an insoluble, infusible solid after 8 minutes.

When as much as 2.7 mols of formaldehyde was used per mol of urea the dehydrated melt containing 3.3% of water did become pasty and finally solid only after 45 minutes at room temperature. However, the melting point of the solid was 105° C. This melt drawn from the evaporator in the manner described above had at 110° C. a life time of 14 minutes and became solid after 25 minutes. This amorphous solid was insoluble in water and in butanol and completely unreactive with acidified alcohols. An attempt to melt it resulted in heavy decomposition with liberation of gaseous formaldehyde.

Even a melt produced by dehydrating the reaction product of 3.0 mols of formaldehyde with 1 mol of urea eventually did solidify after a few hours at 25° C. This microcrystalline solid had a melting point of 97° C. However, the melt from the evaporator when kept at 110° C. became cloudy after 14 minutes and solid after 25 minutes. This amorphous solid was insoluble in water, butanol and all other organic solvents tried and had completely lost its reactivity with acidified alcohols.

A melt of the reaction product of 4.5 mols formaldehyde per 1 mol melamine containing about 7% water had a solidification temperature of 108° C. This solid, though crystalline, could, however, only partly be remelted at about 125° C. with decomposition and formation of an infusible white crust. The easily mobile melt drained from the evaporator into a test tube, maintained at 110° C. became cloudy after 60–90 seconds and thereafter rapidly turned viscous and lost its ability to react with acidified butanol. It had become completely unreactive after 10 minutes and gradually became solid within 15 to 20 minutes from the start of the experiment. Thus, in each of the cases described above the solid degeneration products were insoluble, unreactive and infusible and, hence, useless for producing coating resins.

In the process of the invention, difficulty due to the short life of the melt is avoided by continuously and rapidly transferring the melt from the evaporator to the mixing chamber in which the melt is contacted with the acidified alcohol. In a pilot plant according to the flow sheet of this application, which is described in detail hereinafter, the time for transfer from the evaporator to the mixing reactor was usually 30 seconds for products with comparatively long life. For products with shorter life, the transfer time was reduced to 15 seconds. For a full size plant, more favorable pipe dimensions can be chosen and the transfer time can be reduced to about 5 seconds. For melts with extremely short life, it has been found useful to emulsify the melt with some of the alcohol without addition of acid catalyst, prior to entry of the material into the transfer pump, or to effect the emulsification in the transfer pump. By this procedure clogging of the pump due to solidification of films between moving parts can be avoided. This procedure does not, however, lengthen the life of the melt, and, accordingly, when this procedure is used, the transfer should be effected rapidly.

It must be emphasized that in the process of the invention the advantage of using high temperatures of evaporation and transfer resides not only in the fact that solidification is avoided but to a much higher degree in the expediency of extremely fast evaporation and fast reaction of etherification. By the combination of the three factors, extremely short and effective evaporation of the water from the melt, short transfer time, and fast etherification of the methylol product with the acidified alcohol, as will be described below, the structure of the resin has no time to degenerate. The practical result of this novel combination of features leads to superior curing characteristics of the resins obtained.

Thus, the invention provides a process for the etherification of water-soluble, substantially anhydrous condensation products of formaldehyde and an amino compound containing the group

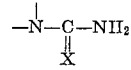

in which X is a member selected from the group consisting of

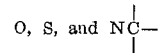

The process comprises continuous passing the condensation product in molten form in contact with an alcohol in liquid form. The alcohol is of the group primary and secondary monohydric and polyhydric aliphatic alcohols. An acid catalyst is included in the reaction medium. The contacting is carried out in a flow path at a temperature above about 85° C. and for a residence time of less than 1 hour, the conditions being such that etherification of the condensation product is effected by the alcohol. The contacting in a flow path can be in any suitable manner wherein the materials are brought together for reaction and the time-temperature conditions are such that undesirable reactions do not occur. Thus, the process of the invention is particularly well suited to continuous operation of the process, as, for example, by effecting the contacting along a continuous flow path into which the reactants are continuously introduced and from which product is continuously withdrawn.

Best results are obtained when the water-soluble, substantially anhydrous condensation product of formaldehyde and an amino compound of the formula set forth above is produced by the method of copending application Ser. No. 565,256, filed Feb. 13, 1956. Thus, the amino compound and formaldehyde are condensed in an aqueous medium to form a condensation product in aqueous solution, and the medium containing such product is then rapidly heated to expel water therefrom and provide a substantially anhydrous melt of the condensation product. This substantially anhydrous condensation product can contain water to the extent disclosed in the said copending application. Thus, the condensation product is "substantially anhydrous" and by this, is meant that it contains not more than about 15% by weight of water. In the case of urea formaldehyde condensation product, the water content can be 2–3%; in the case of melamine formaldehyde, the water content can be about 7% or lower than about 7%. The substantially anhydrous melt is characterized in that it is soluble in water with unlimited dilution, i.e. the melt of the condensation product is a hydrophilic melt. This melt is particularly well suited for contacting, as is described above, with an alcohol for the etherification of the melt to form the products which the invention provides. Preferably the melt is crystallizable on cooling. The crystallizability is enhanced by avoiding prolonged heating of the aqueous reaction mixture between formaldehyde and the amido compound of carbonic acid.

As noted above, it has been proposed in the prior art to employ for etherification as is the concern of the invention, methylolamine compounds wherein the ratio of methylol groups to amino groups, on the basis of the use of urea, is in excess of about 2.5 methylol groups per urea molecule and the aqueous reaction mixtures is heated for such a length of time that it will leave a syrupy residue on evaporation of the water. The resort to such operating conditions occasions disadvantages. In the procedure of the invention, such a high ratio of methylol groups to amino groups is preferably not employed. Thus, in the preferred embodiment of the invention, the ratio of methylol groups to amino groups, based on urea, is less than about 2.5 methylol groups per urea molecule. This ratio of methylol to amino groups is preferably in the range of 2.0–2.5 and very good results are obtained when the ratio is 2.5. In the case of melamine, the ratio can be considerably higher. With melamine a ratio of 1 mol of melamine to 4.5 mols and even 6 mols of formaldehyde provides good results. As noted above, the condensation product of formaldehyde and an amino compound can be produced by the method of the said copending application. The disclosure of the said copending application and the disclosure of the continuation-in-part thereof, Ser. No. 254,547, filed Jan. 24, 1963, are incorporated herein by reference. In the evaporation of water to provide the substantially anhydrous melt, the pH is maintained above about 6.5, and is preferably maintained above about 8.

The alcohols which can be used for the etherification are primary and secondary monohydric and polyhydric aliphatic alcohols. Preferably, these alcohols have up to about 8 carbon atoms. Highly successful results have been obtained with alcohols containing 4–5 carbon atoms. The etherification products produced with alcohols contained about 4–8 carbon atoms are particularly desired according to the invention, since these products are soluble in the usual paint solvents along with other coating composition ingredients. Thus, these resins are soluble in organic solvents. The etherification products produced with alcohols containing up to 3 carbon atoms are desirable in that these products, such as the etherification product formed with methanol, the product formed with ethanol, or the product formed with isopropanol, are water-soluble and hence, can be used in coating compositions employing an aqueous vehicle. Glycols, for example ethylene glycol, can be used, and provide water-soluble amino resins.

As has been indicated above, it is important in the practice of the invention to rapidly transfer the melt of the amino-formaldehyde condensation product to a reaction zone wherein etherification is effected. Thus, in the process of the invention, the substantially anhydrous melt can be formed in an evaporating zone, and this melt can be removed from the evaporating zone immediately following its formation and transferred to the flow path for contacting with the alcohol. The transfer should be made in a period of less than about 2 minutes. The rapidity with which the transfer must be made depends on the ratio of methylol to formaldehyde groups, and the lower this ratio, the more rapid should be the transfer. Thus, the transfer time can be about 2 minutes where the ratio is 2.5 methylol groups per urea molecule; about 60 seconds where this ratio is about 2.2; and about 30 seconds if the amino compound is melamine. A preferred transfer time is less than about 15 seconds. The ultimate criterion, of course, for the transfer time is that the transfer should be effected sufficiently rapidly so that no undesirable reaction of the amino-formaldehyde condensation product occurs.

The time-temperature relationship for the etherification reaction is such that the etherification occurs rapidly without the occurrence of undesirable side reactions. The temperature can be in the range of about 85–175° C., or better in the range of 100–175° C. The preferred temperature range is 110–150° C. The reaction is a liquid phase reaction in that the amine-formaldehyde compound and the alcohol taking part in the reaction are in liquid phase. Desirably, an elevated pressure as is necessary to maintain the reactants in liquid phase is employed. The etherification product is completely soluble in the alcohol utilized for the etherification and a solution of this product in the alcohol is obtained. Prolonged contacting of the reactants is undesirable because detrimental side reactions may occur which cause the resin to become softer. It was found that the equilibrium between the simultaneously occurring etherification of methylol groups with the alcohol, etherification between the methylol groups and, to a considerable extent, formation of $CH_2$-bridges, and their respective reversed reactions is reached rather rapidly.

In the etherification reaction, for the preferred range of 110–150° C., the temperature is considerably above the boiling point of the azeotropic mixture at atmospheric pressure, and, for such operation, super-atmospheric pressure is used to prevent evaporation of the azeotrope from the hot reaction mixture.

As is stated above, the reaction time for the etherification, i.e. the simultaneous etherification and condensation to a coating resin, is less than 1 hour. The preferred reaction time is between about 5 and 30 minutes. The reaction times according to the invention are surprisingly short, particularly in view of the prior art practice wherein reaction times are between 16–24 hours.

With respect to pH, in the reaction between formaldehyde and amine compound, the medium is preferably weakly alkaline. The pH can be about 8 or between about 8 and about 9. In the etherification step, the pH is mildly acid. The acid value can be between about 6 and about 7 (expressed as milligrams of potassium-hydroxide consumed for neutralization of 1 gram of the mixture) for methylol melamines milder conditions are advantageously employed; the acid values can be about 1.

It has been found that secondary butyl alcohol can be used satisfactorily by applying this new method, provided that the concentration of the acid catalyst was held between acid values of 2.5 and 7.5 preferably between 4 and 6. (The acid value is expressed as milligrams KOH consumed for neutralizing 1 gram of a sample.) It was found that secondary alcohols will not react with the methylol compounds at too low acid values so that the methylol compound itself will condense to insoluble products instead of being etherified; at too high acid values the product will gelatinize. In contrast to this, when primary alcohols are etherified with dimethylolurea the acid value can be varied within considerably wider limits.

If the low molecular, water-soluble alcohols methanol and ethanol are used for etherification of a methylol melamine the reaction occurs extremely rapidly and it was found necessary to interrupt the reaction after a few minutes by neutralizing the acid catalyst. Otherwise a rapid polymerisation will occur which would rapidly turn the product into a useless solid. From the neutralized reaction product the water of reaction together with the unreacted excess of the alcohol can be removed by evaporation with or without the use of an entraining agent.

The nature of the acid used is to a large extent immaterial for the result obtained. Thus, hydrochloric acid, phosphoric acid, p-toluyl sulphonic acid, formic acid, oxalic acid, phthalic acid, or mixtures of two or more of these acids, and even carbonic acid, formed by introducing carbon dioxide gas under pressure into the reaction mixture, all gave satisfactory results. Thus, obviously the hydrogen ion functions as catalyst. If organic acids are used as catalyst these are usually esterified with the alcohol during the dehydration step. The resulting product has in this case a very low acid value. When formic acid is used, most of the ester formed distills off the product as an azeotropic mixture.

The short reaction times accommodate the process of this invention to continuous operation. When operating the process continuously, e.g. in an apparatus as described in the examples of this specification, it has been found that the properties of the etherified amino resins produced, most important for their use as coating resins constituents, i.e. the compatibility of the amino resins with various types of alkyds, the pigment wetting properties, the time required for curing the coating film, and its hardness, can be adjusted most effectively by varying the operating conditions in the etherification and condensation step. One outstanding advantage of the method according to this invention, is the fact that it leads to etherified amidoformaldehyde resins which give superior curing properties and great hardness to the coating films in which they are used.

The variable which were found to influence the properties mentioned are temperature and time of reaction of the fused, and therefore unstable, low molecular methylol amido compound with the acidified alcohol in presence of the water formed by the reaction. If the time allowed for this reaction is reduced, the finished dehydrated etherified resins produced need less and less time to cure and the resulting coating film becomes harder. However, the compatibility of the resin and its wetting properties towards pigments becomes somewhat less favorable. If, on the other hand, the temperature of reaction is increased, the compatibility, the wetting properties and other film forming qualities are tremendously improved.

When using urea and a primary alcohol such as normal butyl alcohol, iso-butanol, or the amyl-alcohols, surprisingly high reaction temperatures up to 175° C. can be used. The preferred temperature when using the reagents mentioned, is around 150° C. while the time of the reaction may be varied between 5 and 45 minutes according to the compatibility of the resin, the rapidity of curing and the hardness required. The fact that such high reaction temperatures are beneficial is quite surprising in view of the instability of the fused methylol compound and still more so as said temperatures are even higher than the usual curing temperature of the etherified resin, i.e. the temperature at which it rapidly turns to an insoluble solid.

When using secondary butyl alcohol it is advisable to carry out the treatment at a lower temperature for example a maximum temperature of 115° C. during a time of reaction of about 30 minutes. When using melamine and normal butyl alcohol, favorable results were obtained by a treatment between 110 and 115° C. during 15 minutes.

The reaction mixture which is the product of the etherification reaction chiefly contains, besides the partly etherified and partly condensed resin and the water of reaction, the excess of the alcohol used which functions as solvent. In order to remove the water of reaction, the hot mixture is expanded into an evaporator from which the azeotrope of water and the alcohol used is evaporated essentially at atmospheric or subatmospheric pressure. Any flash evaporator or a thin film evaporator may be used. In most cases the amount of water removed by azeotropic distillation will deprive the resulting resin solution of so much alcohol that the equilibrium composition of the resin will shift much toward condensation. To counteract this effect, an additional quantity of alcohol is introduced either as liquid into the stream of the hot reaction mixture to the evaporator or as vapor into the evaporator.

A further considerable improvement was achieved by carrying out the dehydration of the etherified reaction product in a column. By blowing dry vapor of the alcohol used for the etherification into the bottom of the continuously operating column in countercurrent to the expanded reaction mixture, a very efficient dehydration of the resin solution is achieved and the bottom product of the column, after being cooled down to normal temperature, is a fully satisfactory coating resin of the etherified amino type. The dehydration step can be operated satisfactorily by the combination of the expansion of the reaction mixture, superheated under pressure according to the method of this invention, with the feature of blowing alcohol vapor into the bottom of a column of suitable design, i.e. with as little as possible hold-up. Steam may be used for blowing the reaction product.

The amount of water formed during the etherification reaction is not so great that the removal thereof is essential, and, if desired, this water can be allowed to remain along with the etherified product. This water is, in amount, relatively small as compared with the water introduced with the aqueous formaldehyde used in the first step to provide the melt, and whereas the amount of water introduced with the aqueous formaldehyde is such as to require removal, as indicated, the amount formed during etherification is not so great and its removal is not essential, though it will in many cases be desirable.

For the azeotropic distillation, water-insoluble entraining agents such as benzene, toluene, or a gasoline cut can be used, so that a ternary azeotrope is formed from which an aqueous layer separates.

The following examples illustrate the mode of operation of the improved method and indicate some of the variations possible in its application. The reference numbers used in the examples refer to the drawing, wherein a flow sheet for the process is set forth. The examples indicate the proportions of alcohol used. In general, known proportions for this step can be used.

Example 1

In accordance with the drawing, urea was fed by a continuous conveyor balance 1 at a rate of 6.0 kg. per hour into an elongated dissolving mixer 2 where it was dissolved in a stream of 20.2 kg. per hour of 37% commercial aqueous formaldehyde solution whose pH was adjusted to 9 by adding small quantities of sodium hydroxide solution. These rates of feed correspond to a molar ratio of urea to formaldehyde of 1 to 2.5. The solution was heated to a temperature between 90 and 92° C. and allowed to react for 20 minutes in the reaction coil 3. The hot solution of dimethylolurea formed in the reaction coil 3 was admitted through the valve 4 into the thin layer evaporator 5 which was operated with a steam jacket temperature of 120° C. at an absolute pressure of 35 millimeters mercury column. The water distilled from the evaporator 5 was condensed in the condensor 6 and showed a formaldehyde content between 1 and 2%, which corresponds to a loss between 1.5% and 3% of the formaldehyde feed. The fused dehydrated reaction product contained only about 3% of water and was withdrawn from the evaporator by a transfer pump 7, at a temperature of 95° C. and fed directly into the reactor system constituted by a flow path through the agitator 10 and the reaction coil 11, both operated at a pressure of 7 atmospheres gauge. The dimensions of the lines from the evaporator 5 through transfer pump 7 to the mixer agitator 10 were such that the transfer time for the melt was only about 30 seconds.

Butanol was acidified to an acid value of 4 using 0.85 grams of phosphoric acid per kilogram butanol and per unit acid value. This acidified butanol was fed by pump 8 at a rate of 17.4 kg./h. corresponding to a ratio of 2.4 moles butanol per 1 mol urea through the preheater 9 into the elongated agitator 10. The time of residence in the agitator was 8 minutes. When the preheating temperature of the butanol was adjusted to 105° C., the mixture in the agitator assumed a temperature of 110° C. At this temperature the reaction in the agitator proceeded sufficiently far so that a homogeneous solution entered the reaction coil 11. In the first part of the reaction coil 11, this solution was heated to 155° C. and allowed to react in the reaction coil 11 for a total time of 15 minutes. The reacted mixture which still had a temperature of 145° C. was expanded through the expansion valve 12 into the column 13, operated at atmospheric pressure. The pressure in agitator 10 and the reaction coil 11 up to the expansion valve 12, was 7 atmospheres gauge.

Utilization of a reaction coil such as reaction coil 11 for the etherification and condensation reaction is preferred, and when utilizing such means for the reaction, it is preferred that the reaction be carried out at conditions other than reflux. Thus, it is preferred that the temperature be below the boiling point for the pressure utilized. Refluxing conditions in equipment such as the reaction coil have the disadvantage that curing of the resin occurs on the wall of the coil, and this interferes with heat transfer and eventually clogs the equipment.

Butanol vapor was generated in evaporator 14 and introduced into the lower part of column 13 at a rate of 8.1 kg./h. which was 216% of the quantity needed theoretically in order to form the azeotropic mixture with all the water present. Heat was applied to the reboiler 15 to such a degree that the content of free solvent butanol in the product was reduced to about 30%.

The product withdrawn from the bottom of the column was cooled in cooler 16. It had a viscosity of 11,000 cp. at 20° C. and a solids content of 70%. It had a white spirit tolerance of 2.4 grams per 1 gram of product and a very good compatibility with alkyds and epoxy resins. Paints made with this resin had exceptionally rapid curing properties and the cured paint film was very hard and had very good gloss and gloss retention. The paints were stable on storage for more than double as long as those based on a resin with identical composition produced by batch reaction with a reaction time of 6 hours for the first plus 10 hours for the second stage.

Example 2

The same apparatus was used as in Example 1 and the rates of flow were identical to those applied in Example 1. The only difference in the operating conditions were, that the butanol was acidified to an acid value of 11.0 by adding per liter of butanol 0.36 gram of phosphoric acid and 1.61 grams of phthalic anhydride for every unit of acid value and that steam with a pressure of 10 atmospheres gauge was used in the preheater 9 so that the acidified butanol entered the agitator 10 with a temperature between 175° and 180° C. in the liquid state. Thereby the reaction temperature in the well insulated reactor system consisting of the agitator 10 and the coil 11, was kept so high that the reacted mixture immediately before the expansion valve 12 still showed a temperature of 150° C. The resin produced in Example 2 showed properties which were very similar to those of the product of Example 1.

Examples 3–11

Examples 3 to 11 were carried out using the same apparatus under reaction conditions shown in Table I. For ease of comparison the conditions of Examples 1 and 2 are also listed in Table I. In Examples 7, 8 and 11 the steam pressure in the reboiler 14 was adjusted to 3.5 atm. gauge corresponding to a condensation temperature of 147° C. Moderate vacuum was applied to column 13, so that the solids content at the bottom of the column rose to 60%. In Examples 7, 8, and 9 the dimensions of the transfer line were reduced from that applied in Example 1, so that the transfer time from the evaporator 5 to the agitator 10 was only 15 seconds. In Examples 7 and 8, 35% of the n-butanol used was not acidified and was passed into the transfer line immediately before the transfer pump 7. This procedure was followed in order to reduce tendency of incrustation and fouling of the transfer pump 7. In Table I, PA (in reference to the catalyst) means phthalic acid.

The resins from all the examples, with the exception of No. 9, had exceptionally high white spirit tolerance. The compatibility with alkyds was excellent for the product of all examples without exception. The gloss of paint films made from the various resins was highest for the products of Examples 1, 4, 5 and 7 and was equal to films made with the best competition resins on the market. The pigment wetting properties were best for the products of Examples 1, 5 and 7.

The oven curing properties of the resins produced in Examples 3, 4, 6, 7 and 9 are shown in Table II in comparison with two well known commercial fast curing resins, (A) based on urea, and (B) based an melamine. A ball pendulum hardness tester was used.

All resins were tested in combination with one and the same commercial alkyd resin based on 41% phthalic anhydride and 39% of a mixture of coconut oil and dehydrated castor oil. This alkyd had an acid value of 10 and its solution in 50% xylene had a viscosity of 3000 cp. at 20° C.

The etherified urea and thiourea formaldehyde resins 3, 4, 6, 9, A and C were combined in the weight ratio 40% amino formaldehyde resin to 60% alkyd resin while the etherified melamine formaldehyde resins 7 and B were combined in the ratio 25% amino resin to 75% alkyd.

In all tests the film thickness was 20μ and the curing temperature 120° C.

In order to verify the superior oven curing properties of the resins produced according to the present invention, the products of Examples 1 and 7 were compared with corresponding resins of strictly identical composition (i.e. the proportion of urea nitrogen, combined formaldehyde, and combined alcohol determined by analysis of each of the resins was the same) made by the conventional batch reaction method. Thus, a reaction time of 6 hours was applied for the first stage and 10 hours for the second stage when producing the butylated urea resin D. The melamine resin E was produced by the conventional method which takes 10 hours for the first reaction stage, i.e. reaction of formaldehyde with melamine in presence of butanol and removal of bulk of water introduced with the formaldehyde, and 12 hours for the second reaction stage, i.e. etherification, condensation and removal of the water of reaction. The results of the comparison are shown in Table III. The same alkyd as described in connection with Table II was used for preparing the paints. The curing temperature was 120° C. and the ratio of butylated urea formaldehyde resins to alkyd used was the same as for the experiments of Table II.

However, a ratio of only 20% butylated melamine formaldehyde resin to 80% of the standard alkyd described was chosen in order to prepare softer paint films which facilitate the measurements and the evaluation of results with these relatively hard resins. For the same reason and in order to demonstrate the feasibility of low curing temperatures for the new types of resin, the paint films based on melamine were stoved at only 100° C. The hardness was determined with a Sward Rocker.

The results shown in Tables II and III show that the aminoformaldehyde resins etherified according to this invention and under superatmospheric pressure and at temperatures exceeding the boiling point of the mixture at atmospheric pressure, require considerably shorter times for curing than similar resins produced at lower temperature and atmospheric pressure (Example 3) or than conventional commercial fast curing resins. However, the product of Example 3 shows that even if temperatures below the boiling point of the mixture are used, the resins made according to the present invention show relatively fast curing properties in line with the best commercial resins on the market. This result is due to the feature of letting the practically anhydrous fused methylol compound react with the acidified alcohol during a relatively short time of reaction.

When a similar resin was prepared using the same proportions of raw material as those used in Example 3, but applying conventional batch operating methods with a corresponding long time of reaction, the resin C in Table II was obtained. This resin is obviously not fast curing, but is a satisfactory conventional type.

All urea resins from Examples 1–6 inclusive and Examples 10 and 11, were subjected to cold curing tests in presence of an acid catalyst and a suitable alkyd plasticizer. They all showed excellent cold curing properties. Nevertheless, the prepared application mixtures had five to ten times longer pot lives than those prepared from commercial reference resins with equally fast cure.

TABLE I

| Example | 1 | 2 | 3 | 4 | 5 | 6 | 7 | 8 | 9 | 10 | 11 |
|---|---|---|---|---|---|---|---|---|---|---|---|
| N-Compound: | | | | | | | | | | | |
| Type [1] | Urea | Urea | Urea | Urea | Urea | Urea | Melam. | Melam. | Thiour. | Urea | Urea |
| kg./h | 6.0 | 6.0 | 6.0 | 6.0 | 6.0 | 6.0 | 6.0 | 6.0 | 6.0 | 6.0 | 6.0 |
| 37% Formaldehyde: | | | | | | | | | | | |
| pH | 9.0 | 9.0 | 9.0 | 9.0 | 9.0 | 9.0 | 8.5 | 9.0 | 9.0 | 9.0 | 9.0 |
| kg./h | 20.2 | 20.2 | 20.2 | 17.8 | 17.8 | 20.2 | 17.4 | 17.4 | 16.0 | 16.2 | 20.2 |
| Molar ratio N-comp./formaldehyde | 1/2.5 | 1/2.5 | 1/2.5 | 1/2.2 | 1/2.2 | 1/2.5 | 1/4.5 | 1/4.5 | 1/2.5 | 1/2.0 | 1/2.5 |
| Reaction: | | | | | | | | | | | |
| °C | 90 | 90 | 90 | 90 | 90 | 90 | 95 | 95 | 90 | 90 | 90 |
| Min | 25 | 25 | 25 | 25 | 25 | 25 | 5 | 5 | 25 | 25 | 25 |
| Evaporator: | | | | | | | | | | | |
| Jacket, °C | 120 | 120 | 120 | 120 | 120 | 130 | 145 | 145 | 120 | 120 | 120 |
| Vacuum, mm. Hg | 35 | 35 | 35 | 35 | 35 | 35 | 760 | 760 | 35 | 35 | 35 |
| Melt, temp. °C | 95 | 95 | 95 | 95 | 100 | 100 | 105 | 105 | 95 | 100 | 95 |
| Transfer time: | | | | | | | | | | | |
| Secs | 30 | 30 | 30 | 30 | 30 | 30 | 15 | 15 | 30 | 15 | 30 |
| Type [2] | n-But. | n-But. | n-But. | n-But. | n-But. | s-But. | n-But. | n-But. | n-But. | Isob. | n-Pen. |
| kg./h | 17.40 | 11.8 | 8.5 | 14.8 | 12.5 | 14.8 | 26.5 | 16.2 | 8.5 | 14.8 | 17.8 |
| Alcohol: | | | | | | | | | | | |
| Acid value | 4.0 | 11.0 | 12.0 | 8.8 | 4.0 | 5.7 | 0.5 | 1.0 | 7.5 | 11.0 | 11.0 |
| Catalyst | [3] | [4] | [4] | [4] | [3] | [4] | [3] | PA | [4] | [5] | [4] |
| Molar ratio N-comp./alcohol | 1/2.40 | 1/1.60 | 1/1.15 | 1/2.00 | 1/1.70 | 1/2.00 | 1/7.5 | 1/1.60 | 1/.145 | 1/2.00 | 1/2.00 |
| Mixer, °C | 110 | 150 | 85 | 85 | 85 | 85 | 120 | 150 | 85 | 150 | 85 |
| Reaction coil: | | | | | | | | | | | |
| °C | 150 | 150 | 85 | 150 | 135 | 110 | 120 | 150 | 150 | 150 | 110 |
| Time, min | 15 | 30 | 10 | 10 | 15 | 30 | 15 | 7 | 30 | 30 | 30 |
| Pressure, kg./cm.² | 7 | 7 | 0 | 7 | 7 | 5 | 3 | 7 | 7 | 7 | 7 |
| Alcohol vapor: | | | | | | | | | | | |
| kg./h | 8.1 | 8.1 | 12.6 | 7.4 | 9.6 | 9.6 | 8.1 | 8.1 | 8.1 | 7.4 | 9.6 |
| Percent of theor | 216 | 216 | 352 | 198 | 297 | 250 | 211 | 195 | 292 | 198 | 248 |

[1] Melam.=melamine; Thiour.=thiourea.
[2] n-But.=n-butanol; s-But.=sec.-butanol; Isob.=isobutanol; n-Pen.=n-pentanol.
[3] $H_3PO_4$.
[4] PA+$H_3PO_4$.
[5] Formic acid.

TABLE II

Paint film prepared with butylated amino resins (25%) in combination with a standard alkyd resin (75%). Film thickness: 20μ.

| Product Tested | Pendulum Hardness | | |
|---|---|---|---|
| | 15 min. | 30 min. | 60 min. |
| Example 3 | 23 | 40 | 48 |
| Example 4 | 47 | 57 | 57 |
| Example 6 | 50 | 53 | 64 |
| Example 7 | 49 | 49 | 52 |
| Example 9 | 48 | 58 | 56 |
| A | 27 | 48 | 56 |
| B | 33 | 41 | 46 |
| C | 20 | 29 | 41 |

A = Commercial fast curing American butylated urea formaldehyde resin (Beetle 220-8).
B = Commercial fast curing American melamine formaldehyde resin (Uformite MM 55).
C = Conventional commerical butylated urea formaldehyde resin produced with same proportions of raw materials as used in Example 3.

TABLE III

Comparison of 20μ paint films prepared from the products of Examples 1 and 7, with paint films prepared from conventionally produced resins of identical composition.

| | Sward Rock Hardness | | |
|---|---|---|---|
| Curing time, minutes | 15 | 30 | 60 |
| (a) Urea resins, 25%; alkyd, 75%: | | | |
| Curing temperature, °C | 120 | 120 | 120 |
| Example 1 | 33 | 41 | 47 |
| D | 16 | 32 | 35 |
| (b) Melamine resins, 20%; alkyd, 80%: | | | |
| Curing temperature, °C | 100 | 100 | 100 |
| Example 7 | 12 | 20 | 22 |
| E | 10 | 15 | 16 |

Example 12

The same apparatus and the same conditions of operation were applied as for Example 1. The rate of feed of urea was 6.0 kg. per hour the rate of feed of 37% aqueous formaldehyde, however, was 24.4 kg. per hour. These rates of feed corresponded to a molal ratio of urea to formaldehyde of 1 to 3. All other conditions were the same as in Example 1. Thus the melt was pumped from evaporator 5 with a temperature of 95° C. Its analysis showed 3.5% of water. When a sample of the melt was withdrawn it turned to a microcrystalline paste at room temperature and eventually became hard. The melt was etherified with n-butanol as described in Example 1. The temperature in reactor 10 reached 110° C. and the temperature in the reaction coil 11 averaged 150° C. The etherified and condensed resin solution prepared and dehydrated by azeotropic distillation in column 13 as described in Example 1 and withdrawn through the cooler 16 contained 56.9% solids by evaporation and had a viscosity of 670 cp. at 20° C. When it was used to prepare a coating composition in the same manner as shown in Table II the pendulum hardness of a 20μ film measured after different curing times at 120° C. was:

Curing time (min.): Hardness
15 _____ 37
30 _____ 47
60 _____ 57

For comparison the same molal ratio of urea to 37% aqueous formaldehyde was reacted in the conventional batch method and the heating of the aqueous reaction mixture was continued until a sample of it on evaporation to the same water content of 3.5% left a syrupy residue with no tendency to crystallize. It was then dehydrated by vacuum evaporation at a temperature not exceeding 60° C. to said water content of 3.5% and the syrupy mass etherified with n-butanol in the conventional batch manner at a pH adjusted to 5.5 by addition of phosphoric acid. The product was freed from the water of reaction by the conventional azeotropic batch distillation. The resulting resin solution in n-butanol contained 60% solids as determined by evaporation. When it was used to prepare a coating composition in exactly the same manner and using the same proportions of ingredients as specified in Table 2 the pendulum hardness of a 20μ film measured after the specified curing times at 120° C. was:

Curing time (min.): Hardness
15 _____ Tacky
30 _____ 11
60 _____ 23.5

These results when compared with those quoted above for the resin solution obtained in accordance with the present invention clearly show the outstanding advantage of the method of the present invention, even if unusually high quantities of formaldehyde are reacted with the urea. The results obtained are not caused by disappearance of formaldehyde during the procedure in accordance with this invention. Analysis showed that after evaporation of the water from the product of reaction by the method of this invention the molar ratio of urea to formaldehyde present in the product still was 1 to 2.94. Thus, practically no formaldehyde had been lost.

Example 13

The apparatus shown in the drawing was changed as follows: The reaction coil 3 was taken away and the reaction coil 11 was replaced by a small high speed mixer consisting of a centrifugal pump which a volume of about 200 milliliters provided with a side-intake into which a caustic soda solution could be injected at a constant, accurately adjusted rate in order to neutralize the acid catalyst in the main stream of the reaction mixture passing through the high speed mixer. These simple arrangements are not shown in the drawing.

Melamine at a rate of 4.42 kg. per hour was fed by the conveyor balance 1 into the reactor 2 where it was dissolved in a stream of 14.2 kg. per hour of 37% aqueous formaldehyde whose pH was adjusted to 8.3 by addition of small amounts of concentrated caustic soda lye. These rates of feed correspond to a molar ratio of melamine to formaldehyde of 1 to 5.0. The solution was heated in the reactor 2 to 95° C., the time of reaction being 10 minutes. The hot solution was admitted to the thin layer evaporator 5 which was operated at atmospheric pressure and with a jacket temperature of 145° C. The water evaporated was condensed in condenser 6 and showed a formaldehyde content of 4% by weight. The melt pumped from the evaporator 5 by pump 7 at a transfer temperature of 110° C. contained 7% of water and was fed immediately into reactor 10. The transfer time was 15 seconds. Methanol was acidified with phosphoric acid to an acid value of 4 as defined in Example 1 and fed by pump 8 to the heater 9 where it was heated to 60° C. and passed into reactor 10. In reactor 10 the methanol was allowed to react with the melt with rapid agitation during 3 minutes. The reacting mixture assumed in the reactor a temperature of 85° C. and was passed on into the high speed mixer described above where it was neutralized continuously with sodium hydroxide to a pH of 7. For this purpose a 5-normal sodium hydroxide solution was injected into the high speed mixer at a constant, accurately adjusted rate governed by the pH value. This rate was about 330 ml. per hour. The neutralized solution was expanded through valve 12 into column 13 where part of the methanol and of the water present was evaporated so that the concentrate leaving the bottom of the column had a solids content of 70%. It was withdrawn through the cooler 16. It showed a viscosity of 274 cp. and could be diluted with 6 volumes of water without precipitation. Water-soluble stove curing coating compositions were prepared from this product by combination with water-soluble alkyd resins.

Example 14

The apparatus used was the same as used in Example 13. The conditions of operation and the rate of feed of the melamine were the same as in Example 13. The rate of feed of 37% aqueous formaldehyde, however, was increased to a ratio of 7 mols of formaldehyde to 1 mol of melamine. The amount of phosphoric acid added to the methanol was increased so that the methanol had an acid value of 5.0. In column 13 the water was removed from the accurately neutralized reaction mixture with the aid of vapors of xylene introduced through the evaporator 14. The heat supply in the reboiler 15 was adjusted so that the dehydrated xylene solution of the methylated melamine-formaldehyde resin formed contained 70% of solids.

Example 15

The apparatus was the same as that described in Example 13 with the exception that column 13 and its accessories 14 and 15 were removed and replaced by a thin layer evaporator whose vapor outlet was connected with condensor 17 and whose bottom outlet was connected with cooler 16.

The same rates of feed of melamine, formaldehyde, methanol and phosphoric acid catalyst were used as in Example 14 and the same temperatures as in Example 13. The reacted mixture was neutralized accurately in the high speed mixer and admitted to the thin layer evaporator where all the water was removed together with the excess of methanol. The product was withdrawn as a melt at a temperature of 120° C. from the bottom of the thin layer evaporator and cooled in the cooler 16 to 60° C. When it was allowed to cool down to room temperature it solidified to a paste which was soluble both in water and in white spirit. It contained less than 1% of water and upon analysis it showed a composition indicating hexamethoxymethyl-melamine. When this product was used in making coating compositions these gave films which became extremely tough and hard upon curing.

What is claimed is:

1. Process for the production of etherified amino-formaldehyde resin which comprises contacting formaldehyde and an amino compound containing the group

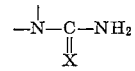

in which X is a member selected from the group consisting of

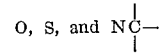

in an aqueous medium to condense the formaldehyde and amino compound and form a condensation product in aqueous solution, rapidly heating said aqueous solution for a time not in excess of 60 seconds to expel water therefrom and provide a substantially unstable, anhydrous melt of the condensation product which is soluble in water with unlimited dilution, contacting said condensation product in the form of unstable, anhydrous melt with alcohol in liquid form and selected from the group consisting of primary and secondary monohydric and polyhydric aliphatic alcohols, and an acid catalyst at a temperature above about 85° C. for a residence time of less than 1 hour sufficient for etherification of the condensation product with the alcohol to form said etherified amino formaldehyde resin.

2. Process according to claim 1, wherein the amino compound is selected from the group consisting of urea, thiourea, and melamine.

3. Process according to claim 1 wherein said heating to expel water is at a temperature in excess of about 95° C.

4. Process according to claim 3 wherein said substantially anhydrous melt is formed in an evaporating zone, and is withdrawn from the evaporating zone as a melt and is initially contacted with said alcohol within 2 minutes following said withdrawal.

5. Process according to claim 1, wherein the amino compound is selected from the group consisting of urea, thiourea, and melamine, wherein the alcohol is a primary alcohol having 4–5 carbon atoms, wherein the temperature of said contacting of condensation product and alcohol is about 100–170° C., the pressure superatmospheric, and the residence time is less than about 30 minutes.

6. Process according to claim 1, wherein said substantially anhydrous melt is formed in an evaporating zone, the anhydrous melt is removed from the evaporating zone immediately following its formation and is initially contacted with said alcohol within 2 minutes following said removal.

7. Process according to claim 1, wherein the alcohol is a primary aliphatic alcohol having up to about 8 carbon atoms.

8. Process according to claim 1, wherein the alcohol is a primary aliphatic alcohol having 4–5 carbon atoms.

9. Process according to claim 1, wherein the temperature of contacting of said melt and said alcohol is about 100–175° C. and the pressure is superatmospheric.

10. Process according to claim 1, wherein the residence time is less than about 30 minutes.

11. Process according to claim 1, wherein said substantially anhydrous melt is formed in an evaporating zone, the anhydrous melt is removed from the evaporating zone immediately following its formation and is initially contacted with said alcohol within 2 minutes following said removal, wherein the amino compound is selected from the group consisting of urea, thiourea, and melamine, wherein the alcohol is a primary aliphatic alcohol having 4–5 carbon atoms, wherein the temperature of contacting of said melt and said alcohol is about 100–170° C., the pressure is superatmospheric, and wherein said residence time is less than about 30 minutes.

12. Process according to claim 1, the product of said contacting said condensation product and alcohol being a mixture comprising the etherified amino compound, water, and unreacted alcohol, said process comprising heating the mixture to evaporate water therefrom as an azeotropic mixture of said alcohol and water.

13. Process according to claim 1, wherein the product of said contacting of condensation product and alcohol is blown with steam.

14. Process according to claim 1, wherein the product of the contacting of condensation product and alcohol comprises a mixture of said etherified amino compound and water, and said mixture is contacted with aliphatic alcohol vapor for azeotropic distillation of water therefrom.

References Cited

UNITED STATES PATENTS

| 2,322,979 | 6/1943 | Siegel | 260—70 |
| 2,377,422 | 6/1945 | Hodgins et al. | 260—70 |
| 2,537,131 | 1/1951 | Grossman | 260—249.6 |
| 2,849,421 | 8/1958 | Weldin | 260—70 |

FOREIGN PATENTS

| 557,364 | 11/1943 | Great Britain. |
| 724,972 | 2/1955 | Great Britain. |

WILLIAM H. SHORT, *Primary Examiner.*

H. SCHAIN, *Assistant Examiner.*

UNITED STATES PATENT OFFICE
CERTIFICATE OF CORRECTION

Patent No. 3,392,150                      July 9, 1968

Herbert P. A. Groll

It is certified that error appears in the above identified patent and that said Letters Patent are hereby corrected as shown below:

Columns 11 and 12, TABLE I, twelfth column, line 13 thereof, "17.8" should read -- 17.6 --; same table, nineth column, line 16 thereof, "1/1.60" should read -- 1/4.60 --.

Signed and sealed this 23rd day of December 1969.

(SEAL)
Attest:

Edward M. Fletcher, Jr.
Attesting Officer

WILLIAM E. SCHUYLER, JR.
Commissioner of Patents